(12) United States Patent
Gao et al.

(10) Patent No.: US 12,383,950 B1
(45) Date of Patent: Aug. 12, 2025

(54) PANEL BODY MANUFACTURING METHOD

(71) Applicant: Nissan Motor Co., Ltd., Yokohama (JP)

(72) Inventors: Li Gao, Kanagawa (JP); Manabu Atsumi, Kanagawa (JP); Daisuke Oiki, Kanagawa (JP); Shohei Iida, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/863,356

(22) PCT Filed: Jun. 20, 2022

(86) PCT No.: PCT/JP2022/024550
§ 371 (c)(1),
(2) Date: Nov. 6, 2024

(87) PCT Pub. No.: WO2023/248297
PCT Pub. Date: Dec. 28, 2023

(51) Int. Cl.
*B21D 35/00* (2006.01)
*B21D 39/02* (2006.01)
*B21D 53/88* (2006.01)

(52) U.S. Cl.
CPC ......... *B21D 35/006* (2013.01); *B21D 39/023* (2013.01); *B21D 53/88* (2013.01)

(58) Field of Classification Search
None
See application file for complete search history.

(56) References Cited

FOREIGN PATENT DOCUMENTS

| | | |
|---|---|---|
| CN | 2770153 Y | 4/2006 |
| CN | 101426597 A | 5/2009 |
| CN | 102089116 A | 6/2011 |
| CN | 203145743 U | 8/2013 |
| CN | 108015139 A | 5/2018 |
| JP | H02187226 A | 7/1990 |
| JP | H7-290182 A | 11/1995 |
| JP | H10-34255 A | 2/1998 |
| JP | 2000-24721 A | 1/2000 |
| JP | 2005125341 A | 5/2005 |
| JP | 2013-86153 A | 5/2013 |

(Continued)

OTHER PUBLICATIONS

First Office Action received for Chinese Application No. 202280096829.9, mailed on Apr. 12, 2025, 6 pages.

(Continued)

*Primary Examiner* — Barbara J Musser
(74) *Attorney, Agent, or Firm* — Global IP Counselors, LLP (57) ABSTRACT

In the manufacture of a panel body composed of a first panel, which has a structure in which two panel materials of different sheet thicknesses are butted and joined, and a second panel, which is arranged on the outside of the first panel and connected thereto by hemming, the first panel is pressed so that the main surfaces of the two panel materials on the joined portion side form a single plane, and a sloped portion due to the difference in sheet thickness appears on the rear side thereof, the main surface of the first panel on the joined portion side is arranged on the second panel side, and hemming of the second panel is performed against the edge portion of the first panel that includes the sloped portion, thereby achieving good interior and exterior appearance quality of the panel body.

6 Claims, 5 Drawing Sheets

(56) References Cited

FOREIGN PATENT DOCUMENTS

| | | |
|---|---|---|
| JP | 2013144300 A | 7/2013 |
| JP | 2016-144979 A | 8/2016 |
| JP | 2018-62280 A | 4/2018 |

OTHER PUBLICATIONS

Zeng, Guo et al., "Numerical simulation of multi-pass roll forming of channel section with outer edge", Journal of Plasticity Engineering, vol. 15, No. 1, Feb. 2008, pp. 127-132.

PANEL BODY MANUFACTURING METHOD

CROSS-REFERENCE TO RELATED APPLICATIONS

This application is a U.S. national stage application of International Application No. PCT/JP2022/024550, filed on Jun. 20, 2022.

BACKGROUND

Technical Field

The present invention relates to a method for manufacturing a panel body provided with a first panel and a second panel, and more particularly relates to a method for manufacturing a panel body provided with a first panel, which has a structure in which two panel materials of different sheet thicknesses are joined, and a second panel, which is arranged on the outside of the first panel and joined thereto by hemming.

Background Information

A conventional method for manufacturing such a panel body is described, for example, in Japanese Unexamined Patent Application Publication No. 2013-86153 (hereinafter referred to as Patent Document 1). The panel body manufacturing method described in Patent Document 1 is a method for manufacturing a panel body provided with a first panel composed of a material of various thicknesses formed by butt-welding a plurality of members of various sheet thicknesses, and a second panel facing the first panel.

In the above-described manufacturing method, the second panel is hemmed so as to sandwich an edge portion of the first panel including a step portion a step part 16 formed by the difference in sheet thicknesses. At this point in the above manufacturing method, the step portion in the edge portion of the first panel is partially cut off, and then the second panel is hemmed to join the first panel and the second panel, thereby preventing or suppressing the occurrence of distortion in the second panel.

SUMMARY

However, in the conventional panel body manufacturing method described above, since the joined portions (welding traces) between the members of the first panel are exposed on the surface of the panel body, it is difficult to achieve both good internal and external appearance quality for the panel body, and solving this problem has been challenging.

The present invention has been devised in view of the above-mentioned problem of the prior art, and has as an object to provide a manufacturing method that can achieve both good internal and external appearance quality of the panel body for the manufacture of a panel body provided with a first panel, which has a structure in which two panel materials of different sheet thicknesses are joined, and a second panel, which is arranged on the outside of the first panel and connected thereto by hemming.

A panel body manufacturing method according to the present invention is a method for manufacturing a panel body provided with a first panel, which has a structure in which two panel materials of different sheet thicknesses are butted and joined, and a second panel, which is arranged on the outside of the first panel and connected thereto by hemming. In this panel body manufacturing method, the first panel is pressed so that the main surfaces of the two panel materials on the joining side form a single plane, a sloped portion due to the difference in sheet thickness appearing on the rear side thereof, and the main surface of the first panel on the joining side is arranged on the second panel. Further, the panel body manufacturing method is such that the first panel and the second panel are joined by hemming the second panel against the edge portion of the first panel including the sloped portion.

By the above-described configuration, the panel body manufacturing method according to the present invention can achieve both good internal and external appearance quality of the panel body for the manufacture of a panel body that is provided with a first panel, which has a structure in which two panel materials of different sheet thicknesses are joined, and a second panel, which is arranged on the outside of the first panel and connected thereto by hemming, since the joined portion of the panel materials of the first panel is arranged on the inner side of the panel body.

BRIEF DESCRIPTION OF THE DRAWINGS

Referring now to the attached drawings which form a part of this original disclosure, selected embodiments are illustrated.

DETAILED DESCRIPTION OF EMBODIMENTS

FIGS. 1 to 5 are diagrams showing an embodiment of a panel body manufacturing method according to the present invention. The panel body in this embodiment is a door panel Dp of an automobile and is provided with an inner panel Ip serving as the first panel and an outer panel Op serving as the second panel.

Figure 1A:
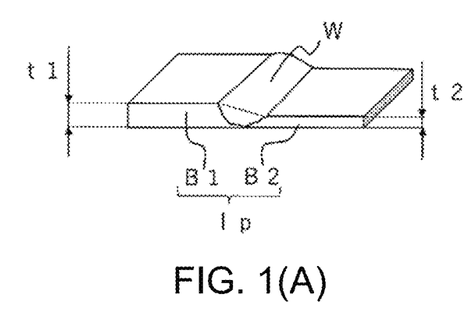
FIG. 1(A) is a perspective view showing a first panel.

The inner panel Ip has a structure in which two panel materials B1, B2 having different sheet thicknesses are butted and joined, as shown in FIG. 1(A). This inner panel Ip is what is called a tailored blank material, with the panel material B1 that has a relatively large sheet thickness t1 arranged on the upper side of the door, and the panel material B2 that has a relatively small sheet thickness t2 arranged on the lower side of the door.

The inner panel Ip has a structure in which the two panel materials B1, B2 are butted together and made into a single unit by, for example, known friction stir welding (FSW) or the like. The inner panel IP thus has a joined portion W along the step formed by the difference in sheet thickness between the two panel materials B1, B2. In the case of friction stir welding, the surface of the joined portion W appears as a weld mark.

Figure 1B:
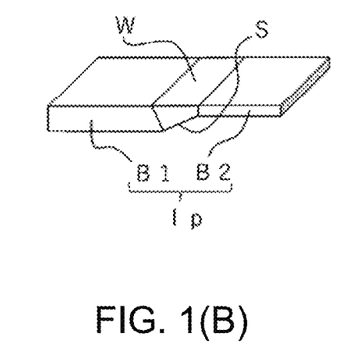
FIG. 1(B) is a perspective view showing the first panel after pressing.
Figure 1C:
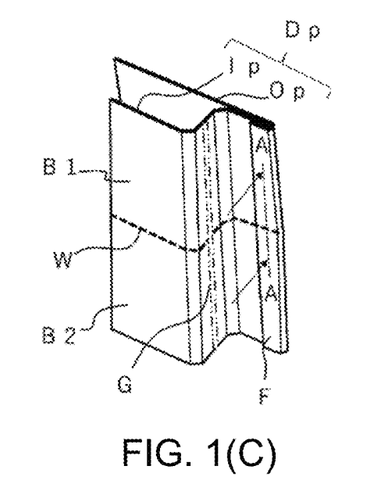
FIG. 1(C) is a perspective view showing the principal parts of the panel body, in a first embodiment of a panel body manufacturing method according to the present invention.

As shown in FIG. 1(C), the outer panel Op, arranged facing the outside of the inner panel Ip, is a metal sheet that forms the exterior appearance of the door panel Dp and is connected to the inner panel Ip by hemming the edge portion.

In the panel body manufacturing method, as shown in FIG. 1(B), the above-mentioned inner panel Ip is pressed so that the main surfaces on the joined portion W side of the two panel materials B1, B2 form a single plane. As a result, a sloped portion S is formed on the rear side of the joined portion W of the inner panel Ip due to the difference in sheet thickness between the two panel materials B1, B2. Note that in the drawings, for the sake of clarity, the difference in sheet thickness between the two panel materials B1, B2 is exaggerated, and the actual gradient of the sloped portion S is smaller than what is shown.

Figure 2A:
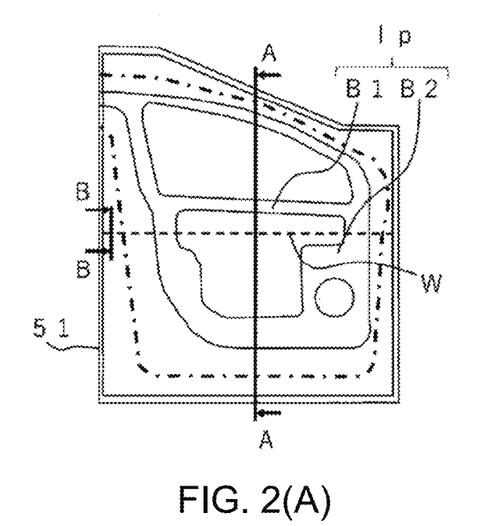
FIG. 2(A) is a plan view of a lower die of a press mold.
Figure 2B:
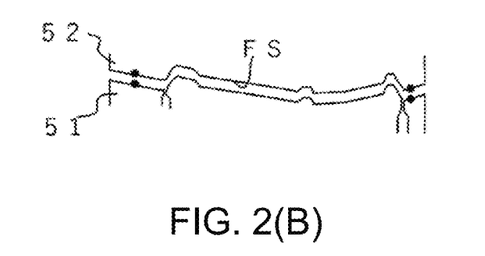
FIG. 2(B) is a cross-sectional view of the press mold based on line A-A in FIG. 2(A).
Figure 2C:
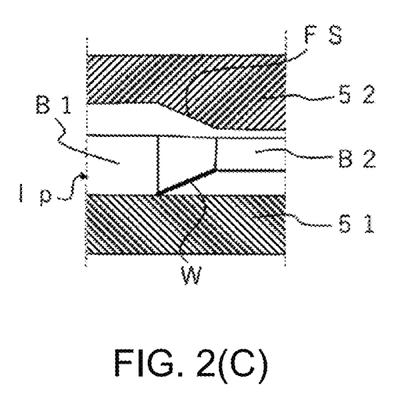
FIG. 2(C) is a cross-sectional view of the press mold based on line B-B in FIG. 2(A) showing principal parts prior to forming.
Figure 2D:
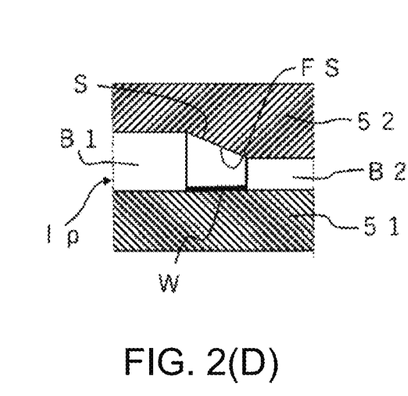
FIG. 2(D) is a cross-sectional view of the press mold based on line B-B in FIG. 2(A) showing principal parts after forming.

The pressing of the above-mentioned inner panel Ip can be performed using the press mold shown in FIGS. 2(A) to 2(D). The press mold is provided with a fixed lower die 51, as shown in FIGS. 2(A) and 2(B), and an upper die 52 that can be raised and lowered facing the lower die 51, and, as shown in FIGS. 2(C) and 2(D), in the section where the joined portion W of the inner panel Ip is formed, the upper surface of the lower die 51 is flat, and the lower surface of the upper die 52 has an inverted shape of the surface on the joined portion W side of the inner panel Ip.

As shown in FIG. 2(C), the press mold is used to position the inner panel Ip on the lower die 51 with the surface on the joined portion W side facing downward; the upper die 52 is then lowered to flatten the surface on the joined portion W side of the inner panel Ip and form the sloped portion S on the rear side of the joined portion W, as shown in FIG. 2(D).

Next, in the panel body manufacturing method, as shown in FIG. 1(C), the main surface on the joined portion W side of the inner panel Ip is arranged facing the outer panel Op side, and the inner panel Ip and the outer panel Op are connected by hemming the outer panel Op against the edge portion of the inner panel Ip including the sloped portion S.

Figure 3A:
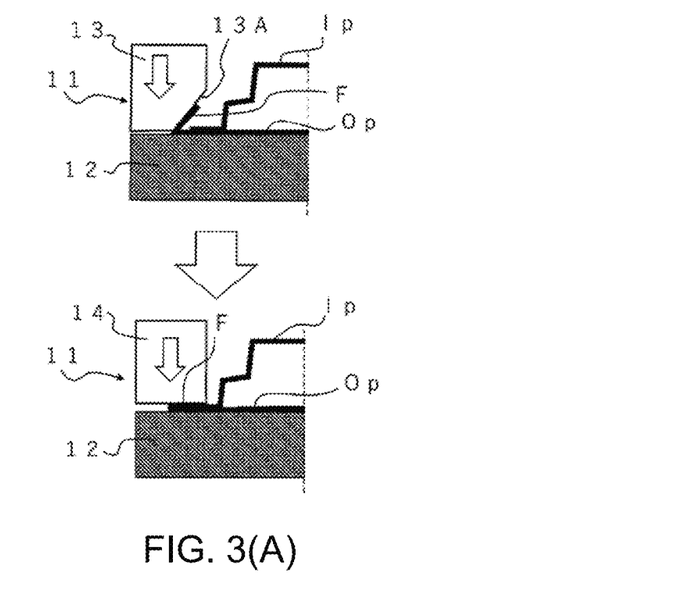
FIG. 3(A) is a cross-sectional view showing a hemming step using a forming die in upper and lower positions.
Figure 3B:
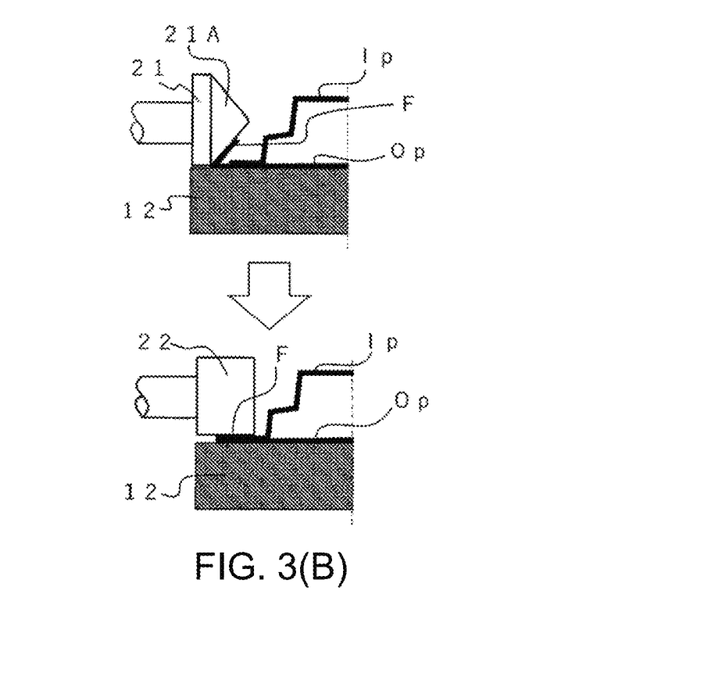
FIG. 3(B) is a cross-sectional view showing the hemming step using a forming roller in upper and lower positions, as specific examples of hemming.

Hemming using a forming die 11 shown in FIG. 3(A) or hemming using forming rollers 21, 22 shown in FIG. 3(B) can be adopted for the hemming of the outer panel Op. In this case, whichever hemming method is adopted, a flange F is formed on the edge portion of the outer panel Op in the previous process.

In the above-mentioned hemming using the forming die 11, a lower die 12, a pre-forming die 13 that is arranged on the upper die side (not shown), and a main forming die 14 that is also arranged on the upper die side are used. The pre-forming die 13 has an inclined surface 13A for pre-bending.

To perform hemming, the outer panel Op is placed on the lower die 12 with the flange F facing upward, and then the edge portion of the inner panel Op is positioned near the flange F. Then, as shown in the upper part of FIG. 3(A), the flange F is pre-bent to an appropriate angle (e.g., 45 degrees) by the inclined surface 13A of the pre-forming die 13. Thereafter, as shown in the lower part of FIG. 3(A), the flange F is folded to sandwich the edge portion of the inner panel Ip using the main forming die 14, thereby completing the hemming.

In the above-mentioned hemming using forming rollers, a lower die 12, a pre-forming roller 21, and a main forming roller 22 are used. The pre-forming roller 21 has a conical surface 21A, and the main forming roller 22 is cylindrical.

To perform hemming, the outer panel Op and the inner panel Ip are positioned in the same way as with the forming die 11, and, as shown in the upper part of FIG. 3(B), the pre-forming roller 21 is rolled along the edge portion of the outer panel OP to pre-bend the flange F to an appropriate angle (e.g., 45 degrees) using the conical surface 21A, after which, as shown in the lower part of FIG. 3(B), the flange F is folded to sandwich the edge portion of the inner panel Ip using the main forming roller 22, thereby completing the hemming.

Figure 4:
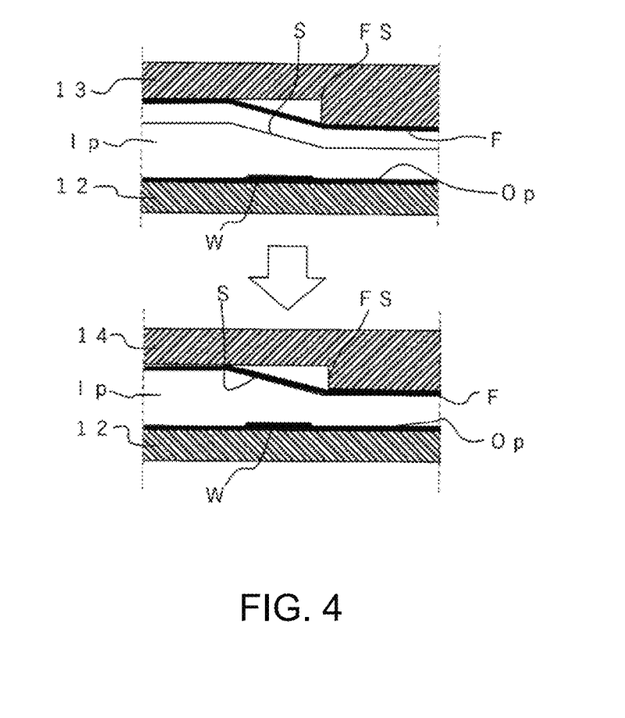
FIG. 4 is a diagram showing an example of using a forming die for hemming in the panel body manufacturing method, where a first step is a cross-sectional view showing the state during pre-forming, and a second step is a cross-sectional view showing the state during main forming.

In the panel body manufacturing method according to the present invention, as shown in the upper part of FIG. 4, when the above-mentioned hemming of the outer panel Op is performed using the forming die 11, the flange F is pre-bent to an appropriate angle (e.g., 45 degrees) using the lower die 12 and the pre-forming die 13 that has a stepped forming surface FS corresponding to the two panel materials B1, B2 of the inner panel Op and the sloped portion S. The forming surface FS can have a structure that has an inclined surface along the sloped portion S; however, good hemming is possible even with a stepped structure, as shown in the illustrated example. Note that FIG. 4 is a cross-sectional view based on line A-A in FIG. 1(C).

Thereafter, as shown in the lower part of FIG. 4, the flange F is folded to sandwich the edge portion of the inner panel Ip using the main forming die 14 that has the stepped forming surface FS corresponding to the two panel materials B1, B2 of the inner panel Op and the sloped portion S, thereby completing the hemming.

Further, in the panel body manufacturing method according to the present invention, when the above-mentioned hemming of the outer panel Op is performed using the pre-forming roller 21 and the main forming roller 22, as shown in FIG. 3(B), the pre-forming roller 21 and the main forming roller 22 that roll along the direction of arrangement of the two panel materials B1, B2 are used. In this case, as a more preferred embodiment of the panel body manufacturing method, hemming of the outer panel Op is performed by rolling each of the forming rollers 21, 22 in the direction from the panel material B2 with the smaller sheet thickness, through the sloped portion S, to the panel material B1 with the larger sheet thickness.

In this embodiment, since the panel body is a door panel Dp, the outer panel Op has a curved surface in many cases. In this case, the inner panel Ip is preferably configured such that the sloped portion S is positioned within the range of the curved surface.

Figure 5:
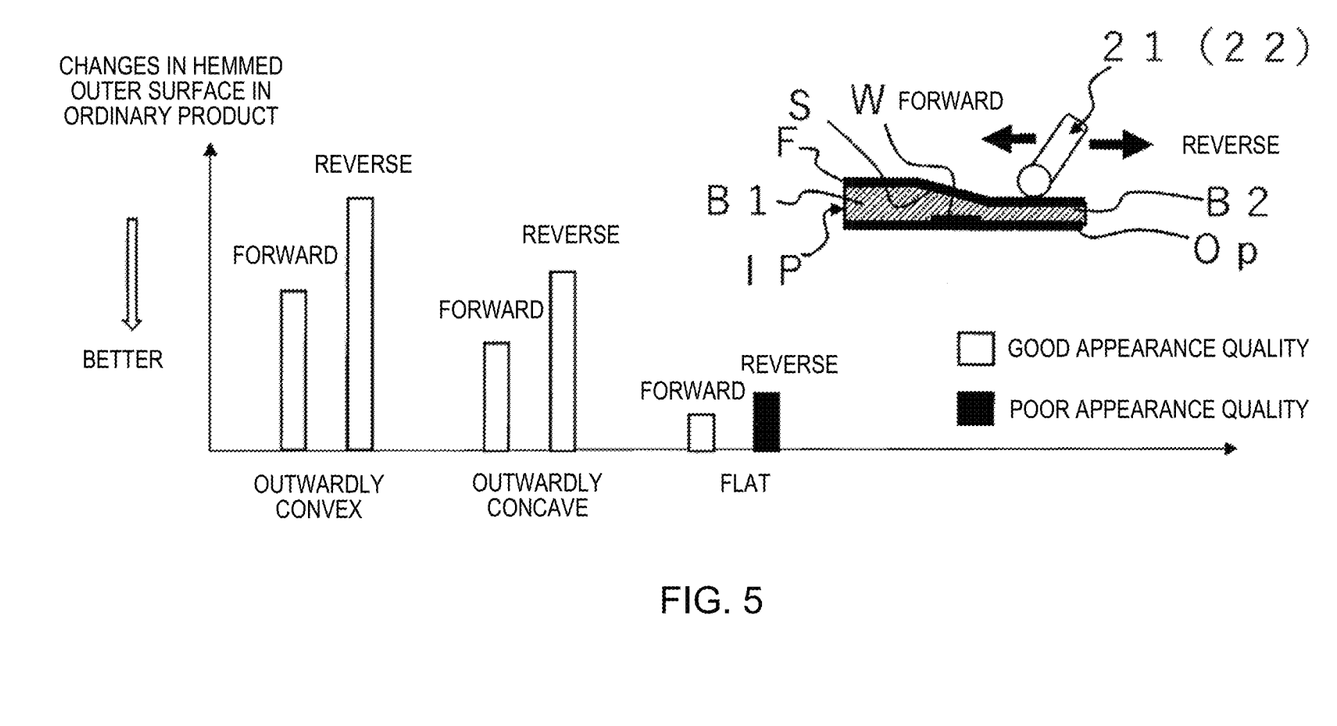
FIG. 5 is a diagram showing an example of using a forming roller for hemming in the panel body manufacturing method and a graph showing the amount of surface change of the second panel in a case in which the second panel has a convex curved surface on the outside, a case in which the second panel has a concave surface on the outside, and a case in which the second panel is flat.

The reason for this is that when hemming is performed using the forming rollers 21, 22, as shown in FIG. 5, if the forward direction of the forming roller is defined as the direction from the panel material B2 with the smaller sheet thickness, through the sloped portion S, to the panel material B1 with the larger sheet thickness, and the reverse direction of the forming roller is defined as the opposite direction, then the amount of surface change in the outer panel Op differs depending on the direction of curvature of the outer panel Op.

Specifically, as shown in FIG. 5, when the outer panel Op has a curved surface that is convex towards the outside (vehicle exterior), the amount of surface change in the outer panel Op is smaller in the forward direction than in the reverse direction. Further, when the outer panel Op has a curved surface that is concave towards the outside, the amount of surface change in the outer panel Op is smaller in both the forward and reverse directions compared to the outwardly convex case, and particularly, the amount of surface change in the outer panel Op is smaller in the forward direction than in the reverse direction. Moreover, when the outer panel Op is flat, there is the risk that the appearance quality of the outer panel Op may be compromised in the reverse direction, but the amount of surface change in the outer panel Op becomes extremely small in the forward direction.

From the foregoing, with respect to hemming performed using forming rollers, not only when the outer panel Op is flat, but also when the outer panel Op has a curved surface, by rolling the forming rollers in the forward direction, that is, from the panel material B2 with the smaller sheet thickness, through the sloped portion S, to the panel material B1 with the larger sheet thickness, it is possible to suppress the occurrence of distortion and the like in the outer panel Op to obtain a good appearance quality.

The above-mentioned panel body manufacturing method is such that for the manufacture of the door panel (panel body) Dp provided with the inner panel (first panel) Ip and the outer panel (second panel) Op, the inner panel Ip is pressed so that the main surfaces on the joined portion W side form a single plane and the sloped portion S appears on the rear side thereof, the main surface of the inner panel Ip on the joined portion W side is arranged facing the outer panel Op side, and the inner panel Ip and the outer panel Op are connected by the hemming of the outer panel Op against the edge portion of the inner panel Ip including the sloped portion S.

As a result, according to the above-mentioned panel body manufacturing method, as indicated by the dotted line in FIG. 1(C), the joined portion (weld mark) W between the panel materials B1, B2 of the inner panel Ip is positioned on the inner side of the door panel Dp, and the distortion of the outer panel Op is also suppressed, thereby making it possible to achieve a good appearance quality both inside and outside of the door panel Dp.

Further, as indicated by the dotted line in FIG. 1(C), rubber components G such as weather strips are attached to the side surface where the thickness of the door panel Dp appears. In this case, if the joined portion (weld mark) W is exposed on the outside of the inner panel IP, there is the risk that the rubber component G will come into contact with the joined portion W, thereby reducing the durability of the rubber component. In contrast, in the door panel Dp fabricated by means of the above-mentioned manufacturing method, the joined portion W is positioned inside, thereby eliminating contact between the joined portion W and the rubber component G and maintaining the durability of the rubber component G.

Moreover, in the above-mentioned panel body manufacturing method, hemming of the outer panel Op is performed using the forming die 11 that has the forming surface FS that corresponds to the two panel materials B1, B2 of the inner panel Ip and the sloped portion S, thereby making it difficult for distortion caused by the sloped portion S to be transferred to the outer surface of the outer panel Op and making it possible to improve the appearance quality of the hemmed portion.

Further, in the above-mentioned panel body manufacturing method, the hemming of the outer panel Op is performed using forming rollers 21, 22 that roll along the direction of arrangement of the two panel materials B1, B2, thereby making it difficult for distortion caused by the sloped portion S to be transferred to the outer surface of the outer panel Op and making it possible to improve the appearance quality of the hemmed portion.

Moreover, in the above-mentioned panel body manufacturing method, hemming is performed on the outer panel Op by rolling the forming rollers 21, 22 in the direction from the panel material B2 with the smaller sheet thickness, through the sloped portion S, to the panel material B1 with the larger sheet thickness, thereby further suppressing the occurrence of distortion caused by the sloped portion S and achieving further improvement in the appearance quality of the hemmed portion, specifically, even in structures with a large difference in sheet thickness between the panel materials B1 and B2.

Further, by using a structure in which the outer panel Op has a curved surface and the sloped portion S of the inner panel Ip is positioned within the range of the curved surface, the above-mentioned panel body manufacturing method can further suppress the occurrence of distortion caused by the sloped portion S, even in structures with a large difference in sheet thickness between the panel materials B1 and B2, and can further enhance the effect of weight reduction.

Moreover, the above-mentioned panel body manufacturing method is suitable not only in the manufacture of door panels Dp but also in the manufacture of panel bodies such as automobile engine hood panels and trunk lid panels, particularly panel bodies that are operated to open and close, and can provide panel bodies with good interior and exterior appearance quality.

The invention claimed is:

1. A panel body manufacturing method comprising:
   pressing a first panel having a first panel material with a first thickness, and a second panel material with a second thickness that is smaller than the first thickness and that is butt joined to the first panel material, the pressing of the first panel causing a first main surface of the first panel material and a second main surface of the second panel material on a first side of the first panel to lie in a single plane, and causing a first minor surface of the first panel material and a second minor surface of the second panel material on a second side of the first panel to be offset with a sloped surface formed by a difference in sheet thickness connecting the first and second minor surfaces;
   arranging the first and second main surfaces of the first panel on a second panel so that the first and second minor surfaces face away from the second panel; and
   connecting the first panel to the second panel by hemming of a flange portion of the second panel against an edge portion of the first panel including the first and second minor surfaces and the sloped surface so that the flange portion of the second panel overlaps the first and second minor surfaces and the sloped surface along the edge portion of the first panel.

2. The panel body manufacturing method according to claim 1, wherein
   using a forming die having a forming surface corresponding to the first and second panel materials of the first panel and the sloped surface when performing the hemming of the second panel.

3. The panel body manufacturing method according to claim 1, wherein
using a forming roller that rolls along a direction of arrangement of the first and second panel materials when performing the hemming of the second panel.

4. The panel body manufacturing method according to claim 3, wherein
the hemming of the second panel is performed by rolling the forming roller in a direction from the second panel material through a sloped portion having the sloped surface to the first panel material.

5. The panel body manufacturing method according to claim 1, wherein
the second panel has a curved surface, and
the sloped portion of the first panel is positioned within a portion of the curved surface.

6. The panel body manufacturing method according to claim 1, wherein
the panel body includes at least one of an automobile door panel, an engine hood panel, and a trunk lid panel, and
the first panel is an inner panel and the second an outer panel.

* * * * *